United States Patent [19]

Shaffer

[11] 3,839,603

[45] Oct. 1, 1974

[54] RING TRIP CIRCUIT EMPLOYING A PARALLEL-T FILTER NETWORK

[75] Inventor: William E. Shaffer, Rochester, N.Y.

[73] Assignee: Stromberg-Carlson Corporation, Rochester, N.Y.

[22] Filed: May 22, 1972

[21] Appl. No.: 255,544

[52] U.S. Cl. .......... 179/18 HB
[51] Int. Cl. .......... H04m 3/04
[58] Field of Search .......... 179/18 HB, 18 F, 18 FA, 179/84 R, 17 E; 333/75

[56] References Cited

UNITED STATES PATENTS

| | | | |
|---|---|---|---|
| 2,495,511 | 1/1950 | Dolberg | 333/75 X |
| 2,996,689 | 8/1961 | Janz | 333/75 |
| 3,187,106 | 6/1965 | Steinmetz | 179/18 HB |
| 3,247,326 | 4/1966 | Clark | 179/18 HB |
| 3,450,844 | 6/1969 | MacDowell | 179/17 EX |
| 3,492,439 | 1/1970 | Billingsley et al. | 179/84 R |
| 3,689,700 | 9/1972 | Lent | 179/16 F |

FOREIGN PATENTS OR APPLICATIONS

| | | | |
|---|---|---|---|
| 1,762,947 | 12/1970 | Germany | 179/18 FA |

*Primary Examiner*—Thomas W. Brown
*Attorney, Agent, or Firm*—William F. Porter, Jr.; Edward A. Gerlaugh; Charles C. Krawczyk

[57] ABSTRACT

A parallel-T filter network is used in a telephone ring trip circuit to provide one path for A.C. ringing signals to the exclusion of D.C. current and a second path for passing D.C. current through the ring trip relay to the exclusion of A.C. ringing signals having a predetermined frequency.

3 Claims, 2 Drawing Figures

RING TRIP CIRCUIT EMPLOYING A PARALLEL-T FILTER NETWORK

BACKGROUND OF THE INVENTION

The present invention pertains to telephone ring trip circuits and in particular to a circuit designed to function with heavy ringing loads.

Ring trip circuits, as is well known, are used in telephone systems for detecting when a telephone call is answered to provide a means in response thereto for removing the ringing signals from the telephone line. Until a call is answered only A.C. signals, such as the ringing signals, can flow between the telephone switching system and the telephone instrument connected to the telephone line. Once a call is answered by lifting of the telephone handset, a loop is completed through the telephone instrument for the flow of D.C. current from a battery usually connected in series with the ringing generator and the telephone line. It is the flow of this D.C. current which provides an indication that the call has been answered.

The ring trip circuit which is connected between the ringing generator and the telephone line is ideally designed to be responsive to D.C. current but not the A.C. ringing signals. Consequently a ring trip relay located in the ring trip circuit is actuated only by the D.C. current when a telephone call is answered to provide control supervision for disconnecting the ringing generator from the telephone line at that time. Unfortunately with the present designs this relay is sometimes operated improperly before a telephone call is answered. As a result the ringing signal is terminated prematurely, sometimes very quickly so that the called party may not even have heard the ring or if the signal was heard before termination, the called party might think that the call was intentionally abandoned and not bother to answer it. In either case this is a highly undesirable situation since it confuses and inconveniences telephone customers and in addition unnecessarily burdens the telephone switching system since equipment previously used must be used once again if the caller wishes to get through to the called party. Once the ringing signal is terminated it can only be restored by dialing the same telephone number again.

The foregoing problem, commonly referred to as premature ring trip, is caused quite often by the connection of multiple telephone instruments to a single telephone line so that the ringing signal applied to the line actuates more than one signalling device (such as a ringer). The simultaneous operation of a number of signalling devices creates heavy ringing loads sometimes drawing A.C. ringing current which exceeds the level above which the ring trip relay is no longer insensitive so that the relay is actuated thereby. For instance, a typical ring trip scheme employs a dual coil relay wherein the two windings are connected in parallel, arranged so that A.C. current flowing therethrough produces equal and opposite magnetic flux fields which cancel each other, causing the relay to remain unoperated. The ring trip circuit is designed so that when a D.C loop is completed more D.C. current flows through one relay winding than the other which creates sufficient net flux due to the current unbalance to operate the relay. Because of manufacturing tolerances, ring trip circuits cannot be designed to completely cancel out the two flux fields produced by the A.C. current flow through both relay windings. With small ringing loads the resultant flux unbalance is likewise small being insufficient to operate the relay and premature ring trip is no problem. With increasing ringing loads however, the A.C. flux unbalance becomes pronounced and may attain a level sufficient to operate the ring trip relay. The greater the ringing load the greater the possibility of premature ring trip.

Although ring trip relays could be made less sensitive to current to avoid the premature ring trip problem caused by large A.C. ringing currents this is not a desirable solution since a relay would then also be less sensitive to D.C. current and would be slow to operate after a call is answered. A much more desirable solution entails an approach wherein the ring trip relay is not made insensitive to A.C. signals passing therethrough but rather is connected in a ring trip circuit so that A.C. signals cannot be applied to its terminals. In this configuration the magnitude of the A.C. ringing current is of no consequence since it does not pass through the ring trip relay and therefore cannot possibly operate it prematurely.

With the foregoing in mind, it is an object of the present invention to provide a new and improved telephone ring trip circuit.

It is a further object of the present invention to provide a new and improved ring trip circuit designed to function with heavy ringing loads without the occurrence of premature ring trip.

It is still a further object of the present invention to provide a new and improved ring trip circuit wherein D.C. current is applied through the ring trip relay while A.C. ringing signals are prevented from being so applied.

BRIEF DESCRIPTION OF THE INVENTION

The telephone ring trip circuit of the invention utilizes a filter network which permits D.C. current to be applied through the ring trip relay but prevents A.C. signals having a particular frequency corresponding to the ringing signal from being so applied. The A.C. ringing signals and battery potential are applied to a telephone line through the input terminals of the network while the ring trip relay is connected directly across its output terminals. The characteristics of the network are such that the A.C. signals passing through the network via a path which blocks D.C. signals produce very little, if any A.C. signal across its output terminals so that a D.C. load connected thereacross passes substantially no A.C. current. In this configuration the relay responds only to the flow of D.C. current when a call is answered and will not trip prematurely on ringing current.

In the specific embodiment disclosed the filter network comprises a pair of resistance-capacitance T networks connected in parallel. The ringing generator and battery are connected in series with the telephone line between the terminal leading to the middle leg of the T network and one of the other terminals. The ring trip relay is connected across the middle leg terminal and the other remaining terminal. The parallel-T resistance-capacitance network has well known characteristics for accomplishing the desired ring trip circuit operation.

An additional feature of the invention provides circuit means connected directly across the input terminals of the filter network to provide a low impedance A.C. path between the ringing generator and the telephone line to ensure adequate ringing current for operating a plurality of signalling devices.

The invention may be fully comprehended by referring to the detailed description hereinbelow together with the two drawings wherein FIG. 1 illustrates how the ring trip circuit of the invention is connected in a telephone series ringing circuit and FIG. 2 illustrates a specific embodiment of the ring trip circuit utilizing a parallel-T resistance-capacitance network.

DETAILED DESCRIPTION OF THE INVENTION

Figure 1:
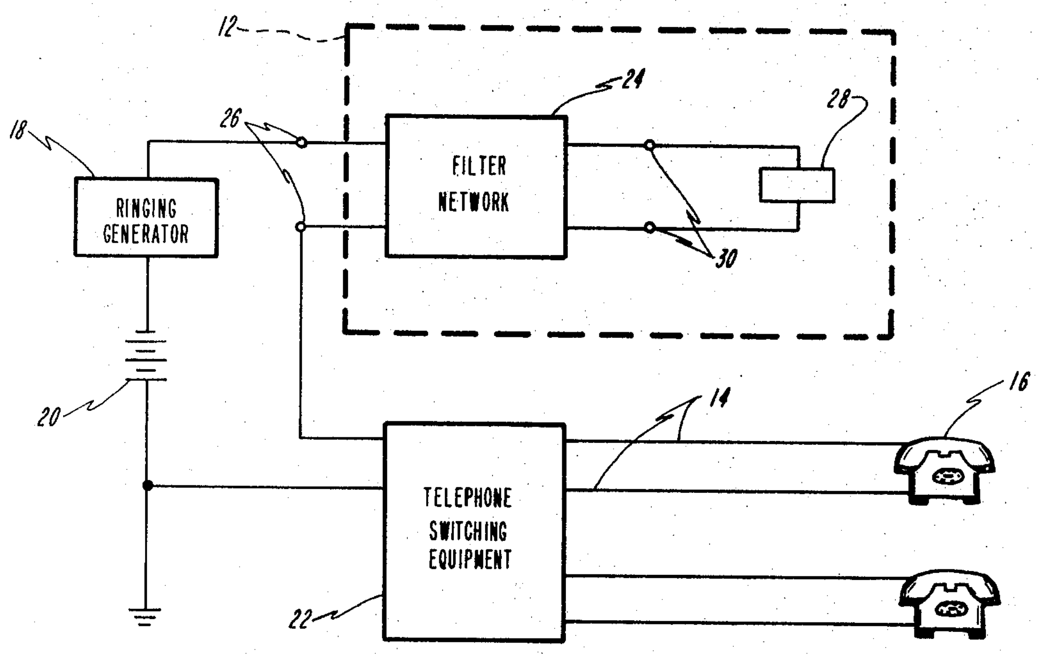

FIG. 1 shows a ring trip circuit 12 connected in a telephone series ringing circuit defined by a telephone line 14 interconnecting a telephone instrument 16 with a ringing generator 18 and a battery 20 through a telephone switching equipment 22. Although only one telephone instrument 16 is shown connected to the telephone line 14 it is understood that any number of such telephone instruments could be connected thereto. The ring trip circuit 12 comprises a filter network, 24 having two input terminals 26, through which A.C. ringing signals are applied to the telephone line 14 by the ringing generator 18 to operate a signalling device in the telephone instrument 16 indicating a telephone call on the line 14 and through which D.C. current flows from the battery 20 when the call is answered upon lifting of the telephone handset. A ring trip relay 28 is connected across two output terminals 30 of the filter network 24 for energization by the D.C. current to actuate contacts (not shown) in the telephone switching equipment 22 which disconnect the ringing generator 18 from the telephone line 14 and connect the latter to the telephone line over which the call was originated to complete a talking path between the calling and called stations. The switching equipment 22 is used to connect the ringing generator 18 to any one of the telephone lines over which ringing signals are to be applied and to complete a talking path connection once the call is answered.

The characteristics of the filter network 24 are such that D.C. current flow between its input terminals 26 must also pass through both its output terminals 30 when a D.C. load is connected thereacross while A.C. signals of a predetermined frequency pass between the input terminals 26 without producing any signal across the output terminals 30. If the predetermined frequency referred to corresponds to that of the A.C. ringing signals, then the ring trip relay 28 cannot be tripped prematurely on ringing current since the filter network 24 prevents the ringing signals but not the D.C. current from being passed through the relay 28. This is the underlying principle of the invention.

Figure 2:
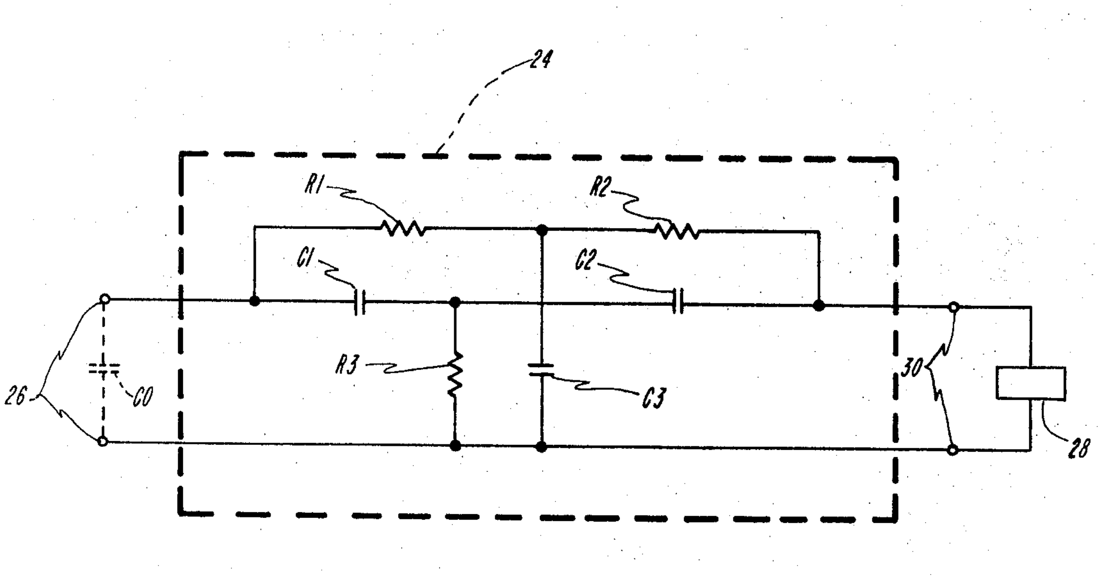

One well known filter network having the desired aforementioned characteristics is the parallel-T resistance-capacitance network shown in FIG. 2. This network comprises two T networks arranged in parallel by connecting corresponding terminals of each together. One T network consists of resistors R1, R2 and capacitor C3 while the other T network consists of capacitors C1, C2 and resistor R3. The terminal leading to the middle leg of each T network is common to both the input 26 and output 30 terminals of the network 24. Resistors R1, R2 and R3 and capacitors C1, C2 and C3 are chosen to satisfy the equations for the parallel-T network so that a null point is achieved at the output terminals 30 for A.C. signals having a frequency corresponding to the frequency of the A.C. ringing signals applied through the input terminals 26. These equations are well known and can be referred to in a number of I.R.E. technical papers such as "The Parallel-T Resistance-Capacitance Network" by Laurence G. Cowles which appeared in the December, 1952 issue of the Proceedings of the I.R.E. and "Analysis of a Resistance-Capacitance Parallel-T Network and Applications" by A. E. Hastings which appeared in the March, 1946 issue. The resistors R1 and R2 and the capacitors C1 and C2 can be made equal to one another if a symmetrical network is desired or these components can be made unequal to meet various system requirements.

A.C. ringing current enters one of the input terminals 26 of network 24 and exits from the other terminal after having passed through the combination of resistors and capacitors. Because of the design characteristics this current produces a null across output terminals 30 so that no portion of the current flows therebetween via the relay 28. It is realized that filter networks such as the parallel-T resistance-capacitance network are subject to manufacturing tolerances so that as a practical matter they cannot completely eliminate A.C. signals at their output terminals and some current will invariably pass therebetween through the connected load. However, their design is flexible enough so that with the judicious selection of component values substantially no A.C. signal will be produced at the output terminals. Actual tests reveal that the level of ringing current passing between the network input terminals can be attenuated by as much as 99 percent at the output terminals leaving little if any current to produce sufficient flux to operate the ring trip relay even under the heaviest ringing load conditions such as the simultaneous operation of twenty ringers. Yet all the steady state D.C. current flows through the relay so that there is sufficient flux under this condition to cause the relay to operate.

With regard to D.C. current applied to the input terminals 26 the only path in the network 24 available for the flow of this current is the series combination of resistors R1 and R2 and the ring trip relay 28 once the capacitors have been charged and steady state has been achieved. The charging times are designed to be fast so as not to unduly delay the response of the relay 28 once a call is answered.

Connection of the filter network 24 in series with a telephone ringing circuit may introduce an A.C. impedance which reduces the ringing current below some minimum acceptable level necessary for operating the connected signalling devices. If this is so, A.C. circuit means such as capacitor CO can be placed directly across the input terminals 26 of the network 24 to provide a low A.C. impedance path between the ringing generator 18 and the telephone line 14 to ensure adequate ringing current. This shunt path permits A.C. ringing signals to be transmitted therethrough but blocks the D.C. current so that the sensitivity of the ring trip relay 28 is not impaired. Furthermore the shunt path does not alter the characteristics of the network so that it performs as already described. One combination of values which was found to provide very good performance with ringing signals having a frequency of 20HZ is the following:

R1 = 918 ohms, R2 = 459 ohms, R3 = 458 ohms,
C1 = 10 microfarads, C2 = 10 microfarads, C3 = 30 microfarads and CO = 50 microfarads It should be noted that in view of the low frequency of the A.C. ringing signal (20HZ being typical) the component values necessary to achieve the desired results are relatively small, thereby permitting components of small physical size to be used in the ring trip circuit, an important consideration in light of the prevalence of printed circuit cards in today's telephone market.

The ring trip circuit of the invention overcomes the premature ring trip problems of prior art devices by preventing A.C. ringing signals from passing through the ring trip relay while permitting D.C. currents to pass therethrough. Consequently, the ring trip relay need not be made insensitive to A.C. signals since there is very little, if any, A.C. signal developed across the relay terminals. Unlike the dual winding type of ring trip relay alluded to earlier heavy ringing loads produce no relay flux unbalance in the present circuit. Thus as the ringing load increases there is less likelihood that premature ring trip will occur.

The use of a filter network to eliminate the need for the ring trip relay to distinguish between A.C. and D.C. currents provides a facile and economical solution to the premature ring trip problem. The specific embodiment disclosed herein comprising a parallel-T resistance-capacitance network is in no way intended to exclude the application to ring trip circuits of other types of filter networks having the desired characteristics to accomplish the objects previously set forth since these other networks may also be used in ring trip circuits without departing from the scope and spirit of the invention as claimed hereinafter.

What is claimed is: is:

1. A ring trip circuit for use in a telephone series ringing circuit, the series circuit including a telephone line, at least one telephone instrument connected thereto, a ringing generator for providing A.C. ringing signals of a predetermined frequency to operate a signalling device in the telephone instrument to indicate a telephone call on the line and a battery for providing a D.C. current when the call is answered, said ring trip circuit comprising a ring trip relay and a filter network having a first pair of terminals for connection in the series circuit and a second pair of terminals for connection to said relay, said filter network comprising a parallel-T resistance-capacitance network providing two current paths, one for passing the ringing signals of said predetermined frequency while blocking D.C. current and the other for passing D.C. current through said relay to the substantial exclusion of the ringing signals of said predetermined frequency.

2. A ring trip circuit for use in a telephone series ringing circuit, the series circuit including a telephone line, at least one telephone instrument connected thereto, a ringing generator for providing A.C. ringing signals of a predetermined frequency to operate a signalling device in the telephone instrument to indicate a telephone call on the line and a battery for providing a D.C. current when the call is answered, said ring trip circuit comprising a ring trip relay and a filter network having a first pair of terminals for connection in the series circuit and a second pair of terminals for connection to said relay, said filter network comprising a pair of T networks connected in parallel, each having first, second and third terminals, the second terminal of each leading to the middle leg of the T network, arranged so that said first and second terminals constitute said first pair of terminals of said filter network and said second and third terminals constitute said second pair of terminals of said filter network, said filter network providing two current paths, one for passing the ringing signals of said predetermined frequency while blocking D.C. current and the other for passing D.C. current through said relay to the substantial exclusion of the ringing signals of said predetermined frequency.

3. The ring trip circuit of claim 2 wherein a first one of said pair of T networks consists of a capacitor in its middle leg and resistors in its other two legs and the other one of said pair of T networks consists of a resistor in its middle leg and capacitors in its other two legs.

* * * * *